(12) United States Patent
Boecker et al.

(10) Patent No.: US 10,604,006 B2
(45) Date of Patent: Mar. 31, 2020

(54) FUEL TANK HAVING ADDITIONAL RESERVE VOLUME

(71) Applicant: TI Automotive Technology Center GmbH, Rastatt (DE)

(72) Inventors: Albert J. Boecker, Ettlingen (DE);
Gerrit Michaelis, Durmersheim (DE);
Peter Grauer, Steinweiler (DE);
Patrick Gmünd, Karlsruhe (DE);
Matthias B. Olbrich, Rastatt (DE);
Alex Ehler, Rastatt (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

(21) Appl. No.: 15/771,625

(22) PCT Filed: Oct. 13, 2016

(86) PCT No.: PCT/EP2016/074535
§ 371 (c)(1),
(2) Date: Apr. 27, 2018

(87) PCT Pub. No.: WO2017/071960
PCT Pub. Date: May 4, 2017

(65) Prior Publication Data
US 2018/0304743 A1 Oct. 25, 2018

(30) Foreign Application Priority Data
Oct. 29, 2015 (DE) .................. 10 2015 221 225

(51) Int. Cl.
*B60K 15/077* (2006.01)
*F02M 37/02* (2006.01)
(Continued)

(52) U.S. Cl.
CPC ......... *B60K 15/077* (2013.01); *F02M 37/007* (2013.01); *F02M 37/0082* (2013.01);
(Continued)

(58) Field of Classification Search
CPC .. B60K 15/077; F02M 37/025; F02M 37/007; F02M 37/0088
See application file for complete search history.

(56) References Cited

U.S. PATENT DOCUMENTS 5,263,846 A   11/1993  Smith
6,283,731 B1 *  9/2001  Yoshioka ........... B01D 35/0273
                                                           417/423.3
(Continued)

FOREIGN PATENT DOCUMENTS

EP    1 238 846 A2   9/2002
JP    2011 069246 A  4/2011

OTHER PUBLICATIONS

International Preliminary Report on Patentability, International Application No. PCT/EP2016/074535, dated May 1, 2018, 9 pgs.
(Continued)

*Primary Examiner* — Kevin L Lee
(74) *Attorney, Agent, or Firm* — Dickinson Wright PLLC

(57) ABSTRACT

The present disclosure relates to a fuel tank having a module pot, which forms a first separate fuel reservoir for a fuel pump arranged inside the fuel tank. To prevent a gap in delivery of fuel to supply the first fuel reservoir in certain operating conditions, in particular when there is persistent lateral acceleration, according to the invention, a second separate fuel reservoir arranged separately from the first fuel reservoir inside the fuel tank is proposed, such that fuel is transferred from the second fuel reservoir into the first fuel reservoir at least when a predetermined acceleration level acting on the fuel tank is exceeded.

9 Claims, 2 Drawing Sheets

(51) Int. Cl.
*F02M 37/00* (2006.01)
*B60K 15/03* (2006.01)
(52) U.S. Cl.
CPC .... *F02M 37/0088* (2013.01); *F02M 37/0094* (2013.01); *F02M 37/025* (2013.01); *B60K 2015/0325* (2013.01); *B60K 2015/03105* (2013.01); *B60K 2015/03111* (2013.01); *B60Y 2400/78* (2013.01)

(56) References Cited

U.S. PATENT DOCUMENTS

| | | | |
|---|---|---|---|
| 6,607,005 B2* | 8/2003 | Viebahn et al. ..... | B60K 15/077 123/510 |
| 8,590,563 B2* | 11/2013 | Martin et al. ........ | F02M 37/106 123/514 |

OTHER PUBLICATIONS

International Search Report for International Application No. PCT/EP2016/074535, dated Dec. 20, 2016, 2 pgs.

* cited by examiner

FUEL TANK HAVING ADDITIONAL RESERVE VOLUME

RELATED APPLICATIONS

This application is a 35 U.S.C. § 371 national phase application of International Application No. PCT/EP2016/074535, filed on Oct. 13, 2016, which claims the priority of German Patent Application DE 10 2015 221 225.4, filed Oct. 29, 2015, the contents of which are incorporated herein by reference in their entirety.

FIELD

The present disclosure relates to a fuel tank having a module pot, which forms a first separate fuel reservoir arranged inside the fuel tank for a fuel pump as well as a method for supplying fuel to the first separate fuel reservoir.

BACKGROUND

Modern vehicles have a so-called module pot arranged in the fuel tank. The module pot contains a fuel pump for supplying fuel to the engine, and at the same time, the module pot forms a fuel reservoir that is separate from the surrounding interior space of the fuel tank and holds a certain reserve volume of fuel, so that sloshing movements in the remaining tank volume, for example, do not result in an interruption in fuel supply to the fuel pump. However, during operation of a motor vehicle, the exceptional case may occur that, because of a low fuel level and persistent lateral acceleration of the vehicle at the same time, the fuel inside the tank runs dry to the suction jet pump delivering fuel to the module pot, and therefore, there is also the risk of the fuel pump running dry, which could result in engine failure or damage to the fuel pump. Although it would be possible to use a module pot having a larger volume, this would have the disadvantage that the manufacturing method for the fuel tank would have to be altered because a larger module pot would not fit through the standardized tank opening for insertion of the module pot.

SUMMARY

Against this background, the present disclosure provides a fuel tank where a supply of fuel to the fuel pump is ensured even when the fuel level is low and there is persistent longitudinal or lateral acceleration of the vehicle.

According to the present disclosure, a second separate fuel reservoir arranged inside the fuel tank, separately from the first fuel reservoir, is provided for the fuel pump, so that at least when a predetermined acceleration level acting on the fuel tank is exceeded, fuel goes into the first fuel reservoir.

The first and/or second fuel reservoir can be filled with fuel by at least one feed pump located near the bottom of the fuel tank, preferably a suction jet pump. Two suction jet pumps are preferably provided, each one supplying one of the fuel reservoirs. Both of the fuel reservoirs are supplied without interruption during normal operation, with the second fuel reservoir then simply overflowing constantly in a cascade to the first fuel reservoir.

In a preferred embodiment of the present disclosure, the second fuel reservoir has a dome section that is closed at the bottom and a side wall section connected to the upper edge region of the dome section by a ring web. The shell-type dome section permits a steady displacement of the fuel therein, during constant acceleration without any sudden sloshing or the like, to at least one through-opening, which is provided in the ring web, and from which a liquid line leads to the first fuel reservoir. The ring web advantageously forms a slightly recessed channel between the dome section and the side wall section, in which fuel can flow to the at least one through-opening. The side wall section ensures that the fuel can flow out only through the at least one through-opening. The side wall section may essentially be arranged at a right angle but may also be inclined toward the inside or provided with a cover. The second fuel reservoir or at least its ring web is expediently arranged above the first fuel reservoir, so that the fuel can flow down into the first fuel reservoir under the influence of the force of gravity.

In an advantageous embodiment of the present disclosure, the second fuel reservoir is arranged on a carrier body for fuel components, the carrier body itself being arranged in the fuel tank. Fuel components may include valves, lines and the like, which are necessary for operation of a modern fuel tank. In a manufacturing process, such fuel components can be premounted on the carrier, which is then inserted into the tank in the course of a blow molding method, or they can be mounted directly on a wall of the tank.

According to the embodiment of the fuel tank as a device, a method for supplying fuel to a fuel pump arranged in a first separate fuel reservoir in a fuel tank, wherein the first separate fuel reservoir is supplied with fuel continuously by means of a first feed pump, is characterized by the following steps:

providing a second separate fuel reservoir, from which a liquid line leads to the first separate fuel reservoir, continuously filling the second separate fuel reservoir with fuel, utilizing the centrifugal force for transport of fuel out of the second fuel reservoir and into the first fuel reservoir when the supply of fuel to the first separate fuel reservoir is interrupted by the feed pump because of a low fuel level in the fuel tank, and at the same time, a persistent longitudinal or lateral acceleration of the vehicle with the fuel tank.

For continuous filling of the second separate fuel reservoir, a second feed pump is preferably used, wherein a suction jet pump may be used as the first and/or second feed pump. A drive line leads from the fuel pump to the intake point of the second suction jet pump, where additional fuel is entrained by the Venturi effect and goes through a line to the second fuel reservoir. The intake point may be located in the side chamber of a saddle tank, for example, wherein the module pot with the fuel pump is located in the main chamber of the tank.

The second separate fuel reservoir is expediently arranged at least partially above the first separate fuel reservoir, so that fuel can flow by the action of gravitational force into the first separate fuel reservoir.

BRIEF DESCRIPTION OF THE DRAWINGS

The invention is explained in greater detail below on the basis of an exemplary embodiment, which is illustrated schematically in the drawings, in which.

Figure 1:
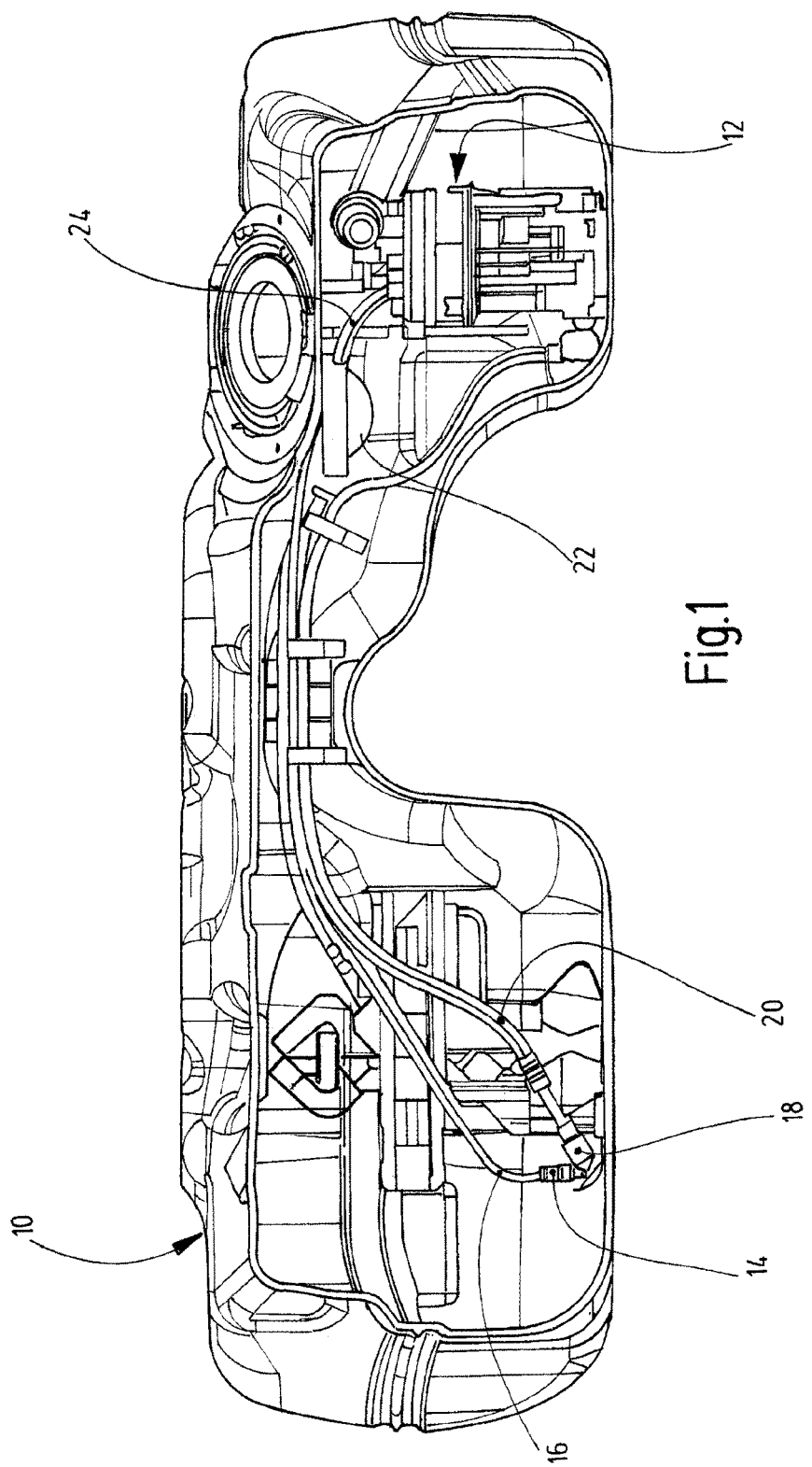
FIG. 1 shows a perspective view of a cut-away of a fuel tank.

detailed description Now, a preferred embodiment of the present disclosure will be described in conjunction with the accompanying drawings. The sizes, materials, and other specific numerical values in the following description of the embodiment are simply by way of examples for ease of understanding of the present disclosure and should not be construed to limit the present disclosure unless otherwise specified. Note that in the description and the drawings, components having substantially the same functions and configurations are designated by the same reference characters, so that their description is not repeated, while components not directly relevant to the present disclosure are not shown.

The fuel tank 10 illustrated in FIG. 1 contains a module pot 12, in which a fuel pump for supplying fuel to an engine is located. The module pot forms a first fuel reservoir 12, which is separate from the remaining tank volume and typically has a fuel supply of approximately 0.5 to 0.7 liter. A drive line 16, which is supplied with fuel by the fuel pump, leads from the module pot into a side chamber of the fuel tank 10, which is embodied as a saddle tank and entrains additional fuel there via a suction jet pump 14, 18. The total flow is sent to a second separate fuel reservoir 22 via another line 20. The suction jet pump 14, 18 conveys fuel without interruption during normal operation of the vehicle. In normal operation, the fuel reservoir 22 is constantly full, and excess fuel flows out through an additional line 24, which connects an upper region of the second fuel reservoir 22 to the first fuel reservoir 12.

When the fuel level in the fuel tank 10 is low, and the longitudinal or lateral acceleration lasts longer, it may happen that the fuel which is present is displaced from the intake point of the suction jet pump 14, 18, so that the pump is no longer pumping any fuel. However, in this case, the acceleration also causes the fuel that is present in the second fuel reservoir 22 to be displaced into the region of the drain location and thereby go through the line 24 to the first fuel reservoir, thus bridging the gap in fuel delivery.

Figure 2:
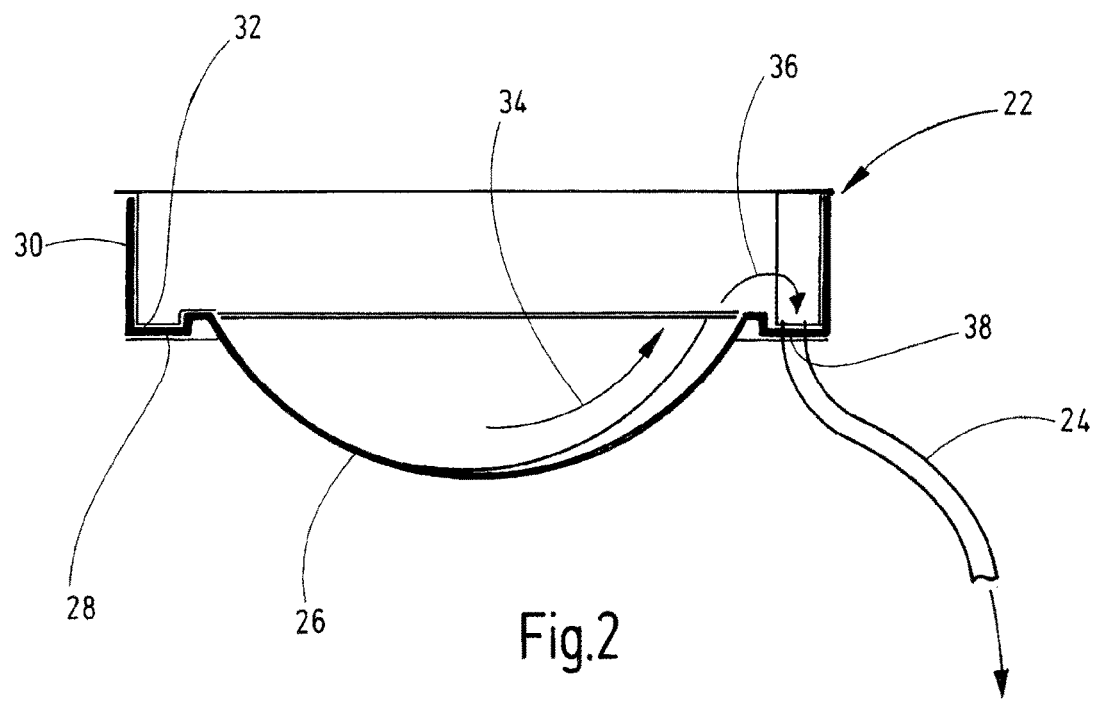
FIG. 2 shows a cross section through a second fuel reservoir arranged in the fuel tank.

The second fuel reservoir 22 is illustrated in greater detail in FIG. 2. It consists essentially of a dome section 26, on the upper edge of which a ring web 28 is connected, so that it is offset slightly downward. A side wall section 30 is connected essentially at a right angle to the outside circumference of the ring web 28, so that a shallow channel 32 is formed between the upper bordering wall of the dome section 26 and the side wall section 30. When there is a corresponding acceleration, the fuel present in the dome section 26 flows into the channel 32, as indicated by the arrows 34, 36, and from there flows through a through-opening 38 and the line 24 to the first fuel reservoir 12.

In summary, the following can be stipulated: the present disclosure relates to a fuel tank 10 having a module pot, which forms a separate fuel reservoir 12 for a fuel pump arranged inside the fuel tank 10. To prevent a gap in the fuel supply in the first fuel reservoir 12 during certain operating conditions, in particular while there is persistent lateral acceleration, a second separate fuel reservoir 22 for the fuel pump arranged inside the fuel tank 10, separately from the first fuel reservoir 12, is proposed according to the invention, such that fuel is transferred from this second fuel reservoir into the first fuel reservoir 12, at least when a predetermined acceleration acting on the fuel tank 10 is exceeded.

The invention claimed is:

1. A fuel tank having a module pot, which forms a first separate fuel reservoir for a fuel pump located inside the fuel tank, wherein a second separate fuel reservoir for the fuel pump located inside the fuel tank separately from the first fuel reservoir, is structured such that fuel is transferred into the first fuel reservoir when a predetermined acceleration level acting on the fuel tank is exceeded, wherein the second fuel reservoir has a dome section, which is closed at the bottom, and a side wall section, which is connected to an upper edge region of the dome section by a ring web, and wherein at least one through-opening, from which a liquid line leads to the first fuel reservoir, is provided in the ring web.

2. The fuel tank according to claim 1, wherein the first and/or the second fuel reservoir is/are filled with fuel by at least one feed pump located adjacent the bottom of the fuel tank.

3. The fuel tank according to claim 1, wherein the ring web of the second fuel reservoir is arranged above the first fuel reservoir.

4. The fuel tank according to claim 1, wherein a feed pump is a suction jet pump and is arranged in the fuel tank and delivers fuel to the second fuel reservoir.

5. The fuel tank according to claim 1, wherein the second fuel reservoir is arranged on a carrier body for fuel components, and wherein the carrier body arranged in the fuel tank.

6. A method for supplying fuel to a fuel pump arranged in a first separate fuel reservoir in a fuel tank of a vehicle, wherein the first separate fuel reservoir is supplied with fuel continuously by means of a first feed pump, the method having the following steps:
   providing a second separate fuel reservoir, from which a liquid line leads to the first separate fuel reservoir, wherein the second fuel reservoir has a dome section, which is closed at the bottom, and a side wall section, which is connected to the upper edge region of the dome section by a ring web, and wherein at least one through-opening, from which a liquid line leads to the first fuel reservoir, is provided in the ring web;
   continuously filling the second separate fuel reservoir with fuel; and
   utilizing a centrifugal force on the fuel tank for conveying fuel out of the second fuel reservoir into the first fuel reservoir via the at least one through-opening and liquid line when the supply of fuel to the first separate fuel reservoir by means of the feed pump is interrupted because of a fuel level in the fuel tank, the centrifugal force due to a persistent longitudinal or lateral acceleration of the vehicle equipped with the fuel tank.

7. The method according to claim 6, wherein a second feed pump is used for continuous filling of the second separate fuel reservoir.

8. The method according to claim 7, wherein a suction jet pump is used as one of the first and second feed pump.

9. The method according to claim 6, wherein the second separate fuel reservoir is arranged at least partially above the first separate fuel reservoir.

* * * * *